United States Patent Office 3,239,381
Patented Mar. 8, 1966

3,239,381
BATTERY SEPARATOR IMPREGNATED WITH A PHENOL-ALDEHYDE RESIN COMPOSITION
Frank Stanton O'Connell, Holyoke, Mass., assignor to Monsanto Company, a corporation of Delaware
No Drawing. Filed May 21, 1962, Ser. No. 196,486
6 Claims. (Cl. 136—146)

This invention relates to a composition of a phenol-aldehyde resin and a surface active agent and to a fibrous battery separator impregnated with the composition.

Fibrous battery separators are used extensively in batteries of either the conventional wet lead-acid type or the so-called "dry charge" lead-acid type. It is necessary that these fibrous structures be protected from attack by the acid employed in the batteries. Therefore, when cellulosic fibrous battery separators are employed, they are impregnated with a phenol-aldehyde type of resin, which resin, when advanced to the infusible state, protects the fibers of the cellulosic battery separator from attack by the acid. In addition, it is necessary that the battery separators absorb or become rewetted by the battery acid rapidly, particularly in the so-called "dry charge" lead-acid type. This is essential so that the electrical resistance of the separator will reach its minimum value, within as short a time as possible, after addition of the battery acid. This requires incorporation a surface active agent with the phenol-aldehyde type of resin. To function properly, however, the surface active agent must allow rapid rewetting of the battery separator by the battery acid, must remain stable at high temperatures and must not leach out with water or with an acid solution.

Therefore, it is an object of this invention to provide a composition comprising a phenol-aldehyde resin and surface active agent.

It is another object of this invention to provide a fibrous battery separator impregnated with a composition comprising a phenol-aldehyde resin and a surface active agent.

Briefly, the above and other objects of this invention are attained by incorporating with a phenol-aldehyde resin certain surface active agents and impregnating cellulosic fibrous battery separators therewith.

The following exmples are set forth to illustrate more clearly the principle and practice of this invention to those skilled in the art and are not to be construed as limitations on the invention. Unless otherwise stated all parts and percentages are on a weight basis.

EXAMPLE I

*Part A.*—A one-stage water-dilutable phenol-formaldehyde resin, prepared by condensing 1.5 mols of formaldehyde per mol of phenol in the presence of a sodium hydroxide catalyst, is admixed with about 4% of a surface active agent based on the weight of the resin solids. The surface active agent is the product of condensing propylene oxide with ethylene diamine and then further condensing the reaction product with ethylene oxide. The resulting surface active agent has a number average molecular weight of about 2000 and an oxyethylene content of about 40% based on the total weight of the surface active agent.

*Part B.*—Part A is repeated except that the surface active agent employed herein is the product of condensing propylene oxide with propylene glycol and then further condensing the reaction product with ethylene oxide as set forth in U.S. 2,674,619. The number average molecular weight of the resulting product is about 2700 and the oxyethylene content is about 40% based on the total weight of the surface active agent.

EXAMPLE II

*Part A.*—The compositions of Example I are diluted to about 30% solids and are then used to separately treat cellulosic fibrous battery separator sheets by hand-dipping in the resin compositions until the sheets are thoroughly impregnated with the resin composition. The battery separator paper sheets have a Gurley porosity of about 5 seconds using a 5 ounce cylinder and a ¼ sq. in. orifice.

The treated sheets are dried at about 25° C. for 30 minutes and are then subjected to a temperature of about 170° C. for about 10 minutes. The samples are found to have picked up about 30% by weight of the resin composition. The samples are designated as A and B, corresponding to the resin composition of Part A and Part B of Example I.

As a control, the one-stage phenol-formaldehyde resin of Example I is used without a surface active agent to treat the same type of battery separator sheets under the same conditions. This sample is designated as C.

*Part B.*—The samples as prepared in Part A are completely immersed in a 14% aqueous sulphuric acid solution for about 15 minutes. The samples are removed and washed with copious amounts of running hot water at about 65° C. for about 1 hour. The samples are then dried at 110° C. for about 10 minutes.

To determine rewettability of the treated samples, they are gently floated on the surface of a 37% aqueous sulphuric acid solution until they are completely rewetted. Time of rewetting is measured with a stopwatch from the time the samples are floated on the surface of the acid solution until the sample is completely rewetted. The results are as follows—

*Table 1*

| Sample: | Rewettability time |
|---|---|
| A | 4 seconds. |
| B | 33 seconds. |
| C | No wetting after 30 minutes. |

This example clearly shows that when cellulosic fibrous battery separators are impregnated with the resin composition of this inventoin, much faster rewetting of the battery separator is obtained with an acid solution which is comparable to that employed in the lead-acid batteries.

This invention is directed to a single phase resin composition comprising in admixture a phenol-aldehyde resin and a surface active agent. More particularly, it is directed to the resin composition containing 0.1–10.0 weight percent and preferably 0.1–4.0 weight percent of the surface active agent based on the weight of the phenol-aldehyde resin solids employed. In addition, this invention is also directed to a cellulosic fibrous permeable battery separator which is thoroughly impregnated with the resin composition of this invention and wherein the phenol-aldehyde resin has been advanced to the infusible state.

The surface active agent employed herein is the condensation reaction product of propylene oxide and ethylene oxide with a nitrogen-containing reactive hydrogen compound. In particular, the surface active agent can be any one of the surface active agents set forth in U.S. 2,979,528 wherein the nitrogen-containing compound is the nucleus of the condensation reaction and can have 2–6 reactive hydrogen atoms and 1–6 carbon atoms and the terminal groups of the surface active agent are oxyethylene.

In the practice of this invention, the surface active agents as set forth in U.S. 2,979,528 should have a number average molecular weight of about 500 to about 10,000 and preferably 1500–6000. The number average molecular weight range of the surface active agents employed herein is set forth merely for convenience to allow ease of application of the resin composition for impregnating a permeable fibrous battery separator so as to insure thorough impregnation thereof. It is conceivable, therefore, that a surface active agent having a number average molecular weight of 25,000 as set forth in U.S. 2,979,528 may possibly be used in the application of impregnating a cellulosic fibrous battery separator sheet. In addition, the surface active agent may have an oxyethylene content of 3–90 weight percent and preferably 3–40 weight percent based on the weight of the surface active agent. Although the surface active agent employed in the practice of this invention can have terminal groups of either oxypropylene or oxyethylene or mixtures of both when condensing propylene oxide and ethylene oxide with the nitrogen-containing compound, the preferred surface active agent is one having oxyethylene as the terminal groups as set forth in U.S. 2,979,528 with the preferred nitrogen-containing compound being ethylene diamine.

Any phenol-aldehyde resin may be employed in the practice of this invention. Particularly useful, however, are the phenol-formaldehyde resins which are generally prepared by the condensation reaction of about 0.5–3.0 mols of formaldehyde per mol of phenol in the presence of appropriate catalysts. The phenol-formaldehyde resins may be either a two-stage resin, a one-stage resin recovered in water, a one-stage resin recovered in an organic solvent or a liqud novolac two-stage resin having water associated with it. The preparation of these resins is generally well-known and the type of phenol-formaldehyde resin obtained depends upon the ratio of formaldehyde to phenol and the catalyst chosen for the reaction.

As is well-known in the art, the catalyst employed in the reaction may be either acidic or basic in nature. The preferred phenol-aldehyde resin to be employed in the practice of this invention is a phenol-formaldehyde resin prepared by reacting 1.1–3.0 mols of formaldehyde per mol of phenol in the presence of an alkaline catalyst and wherein the reaction product is recovered in water. The phenol-formaldehyde resin employed in the practice of this invention should also have a water tolerance of 0.1 volume of water per equal volume of resin to greater than 50 volumes of water per volume of resin.

Typical examples of other phenol-aldehyde resins which can be employed in the practice of this invention are resorcinol-formaldehyde, catechol-formaldehyde, phenol-acetaldehyde, phenol-butyraldehyde and alkylated phenol-formaldehyde, e.g., cresol-formaldehyde, xylenol-formaldehyde, etc.

This invention is also directed to a cellulosic fibrous permeable battery separator which is thoroughly impregnated with the resin composition of this invention and wherein the phenol-aldehyde resin is advanced to the infusible state. The cellulosic fibrous battery separator of this type is generally prepared by first admixing the phenol-aldehyde resin and the surface active agent. The surface active agent may be added either as 100% active material or as a solution in a solvent compatible with the surface active agent and the phenol-aldehyde resin. The cellulosic fibrous battery separator is then treated with the composition of this invention by either the wet-web saturation method or the dry-web method. In either method, it may be desirable to dilute the resin composition in order to obtain the desired pickup. The treated cellulosic paper is dried to remove excess solvent and is then subjected to a temperature of about 200° F. to about 600° F. in order to advance the phenol-aldehyde resin to an infusible state. The time of exposure of the treated cellulosic fibrous battery separator to these temperatures will vary from approxiamtely 30 minutes at 200° F. to about a few seconds at 600° F. In addition, the cellulosic fibrous battery separator is generally ribbed to increase its resistance to degradation during use thereof in a lead-acid battery. Generally, it is also desirable to impregnate the cellulosic fibrous battery separator with about 20–50 weight percent of the resin composition of this invention.

Alternatively, the cellulosic fibrous battery separators may be first treated with the phenol-aldehyde resin alone, and secondly, in a separate operation, treating the battery separator with the surface active agent either before or after subjecting the phenol-aldehyde treated fibrous battery separator to the elevated temperatures.

Although the preferred battery separator employed in the practice of this invention is a cellulosic fibrous permeable structure having a Gurley porosity of about 1–25 seconds when using a 5 ounce cylinder and a ¼ sq. in. orifice, other battery separator structures may be prepared by either incorporating the resin composition of this invention or just the surface active agent alone. For example, the resin composition may be used to bind and coat battery separators prepared from glass fibers or diatomaceous earth or combinations of both with or without cellulosic fibers. In addition, the surface active agent alone may be incorporated in polyvinyl chloride separators, hard rubber separators or other materials wherein speedy rewettability by the battery acid solution is desired.

The advantages of this invention are found in that the battery separators impregnated with the resin composition of this invention are rapidly rewetted by the battery acid solution. The electrical resistance of the battery separator rapidly reaches its minimum value well within 10 minutes after addition of the battery acid to the battery. This advantage allows almost immediate use of the so-called "dry charge" lead-acid battery without injuring the battery separators or the battery itself.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A cellulosic fibrous permeable battery separator which is thoroughly impregnated with a resin composition, said resin composition comprising in admixture a phenol-aldehyde resin and a surface active agent wherein the phenol-aldehyde resin in advanced to an infusible state and the surface active agent has a number average molecular weight of about 500 to about 10,000 and consists of oxypropylene groups, oxyethylene groups and the nucleus of a nitrogen containing reactive hydrogen compound having not more than 6 carbon atoms per molecule and having 2–6 reactive hydrogen atoms, the structure of the compound being such that all of the oxypropylene groups are present in oxypropylene chains that are attached to the reactive hydrogen atoms and all of the oxyethylene groups are present in oxyethylene chains that are attached to the ends of the oxypropylene chains.

2. The battery separator of claim 1 wherein the resin composition comprises 20–50 weight percent of the fibrous permeable battery separator.

3. The battery separator of claim 1 wherein the resin composition comprises 0.1–10.0 weight percent of the surface active agent based on the weight of the phenol-aldehyde resin.

4. The battery separator of claim 1 wherein the phenol-aldehyde resin is the phenol-formaldehyde condensation reaction product of 1.1–3.0 mols of formaldehyde per mol of phenol in the presence of an alkaline catalyst.

5. The battery separator of claim 1 wherein the surface active agent has a number average molecular weight of about 1500 to about 6000 and has an oxyethylene content of about 3–90 weight percent of the surface active agent.

6. The battery separator of claim 1 wherein the surface active agent has an oxyethylene content of 3–40 weight percent of the surface active agent and the terminal groups thereof are oxyethylene and wherein the nitrogen-containing reactive hydrogen compound is ethylene diamine.

References Cited by the Examiner
UNITED STATES PATENTS

| | | | |
|---|---|---|---|
| 2,662,107 | 12/1953 | Uhlig et al. | 136—146.4 |
| 2,678,961 | 5/1954 | Uhlig et al. | 136—146 |
| 2,887,522 | 5/1959 | MacKenzie | 136—146 |
| 2,956,966 | 10/1960 | Steckler | 260—19 |
| 2,960,559 | 11/1960 | Magill et al. | 136—146 |
| 2,979,528 | 4/1961 | Lundsted | 260—584 |
| 2,980,750 | 4/1961 | Mills | 136—146 |

WINSTON A. DOUGLAS, *Primary Examiner.*

JOHN R. SPECK, JOHN H. MACK, *Examiners.*